Patented Sept. 1, 1942

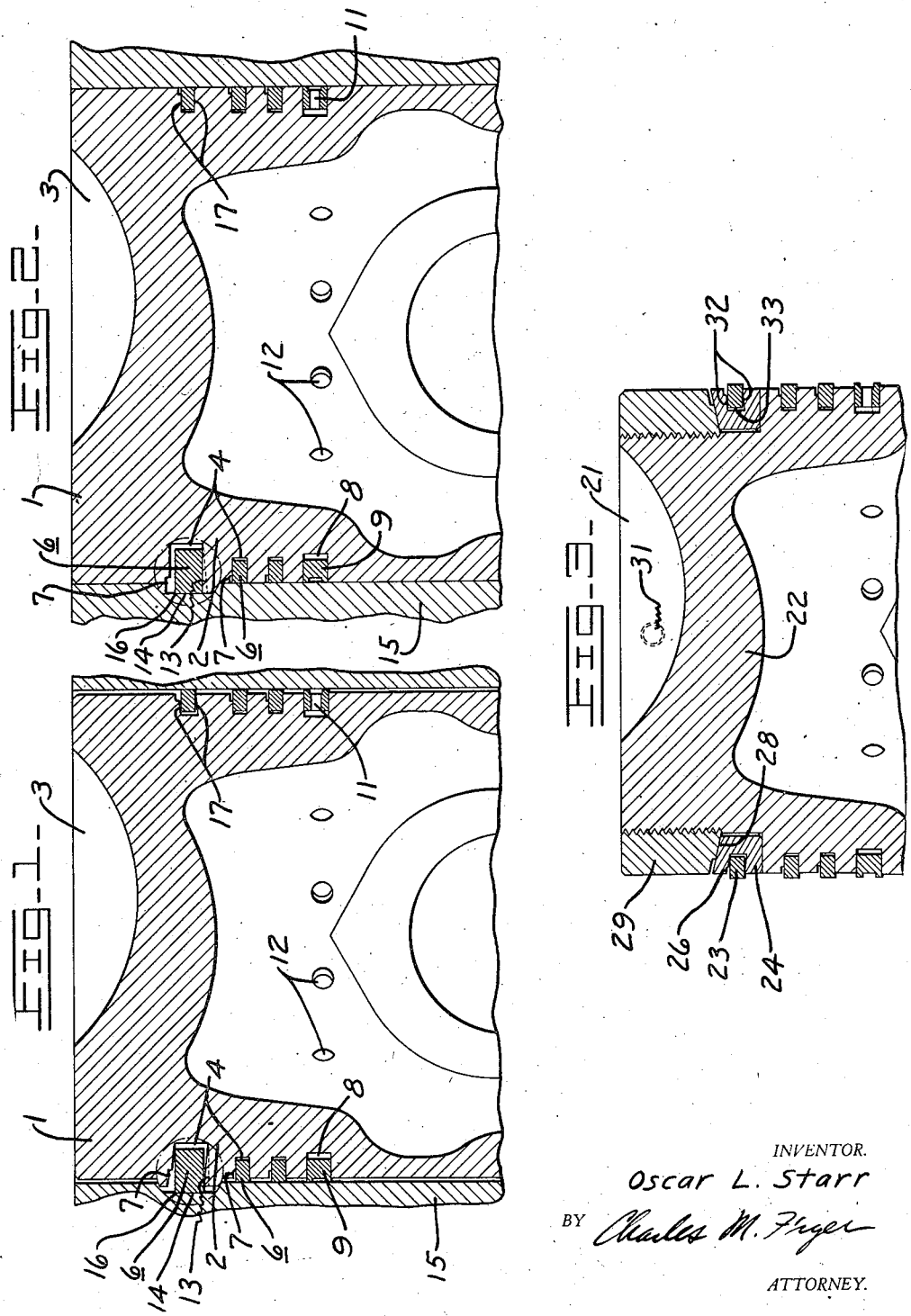

2,294,519

UNITED STATES PATENT OFFICE 2,294,519

PISTON STRUCTURE

Oscar L. Starr, Mission San Jose, Calif., assignor to Caterpillar Tractor Co., San Leandro, Calif., a corporation of California Application August 9, 1941, Serial No. 406,140

7 Claims. (Cl. 309—14)

My invention relates to pistons, and more particularly to mounting of a piston ring in its seating groove. In the following description and claims, the crown of the piston is considered the top thereof, irrespective of how the piston is adapted to be positioned, as determined by the type of engine in which it is adapted to be employed.

Under operating conditions and temperatures in an engine, the crown of a piston, being subjected directly to the heat of combustion, is hotter than the remainder of the piston body. Consequently, it will expand to a greater extent, which results in bowing of the crown or distortion of the body of the piston adjacent the crown. Such bowing or distortion causes the piston ring grooves adjacent the crown to tilt downwardly from the normal position they have when the piston is cold; and consequently the outer peripheral faces of the piston rings adjacent the crown, particularly the top compression ring, may have a downward and inward inclination when the piston is working. As a result, the peripheral face of such a piston ring, instead of having flush full face sealing contact with a cylinder wall, may contact the cylinder wall only along its upper outer peripheral edge, which would result in scratching or scoring of the cylinder wall and inefficient sealing should such downward inclination be excessive. Such misalinement of the piston ring with respect to the cylinder wall is particularly undesirable when the ring is caused to seat flush against the lower side of its groove by the pressure of gases during the working or firing stroke of the piston and by forces resulting from upward movement of the piston during its compression stroke, because this results in blow-by with consequent loss of compression.

In commercial production of pistons, effort has been heretofore made to have the upper and lower sides of the piston ring seating groove so related with respect to the piston ring that when the ring seats flush against either of such sides, the outer peripheral face of such ring will be parallel to the axis of the piston when cold, in an effort to avoid excessive misalinement of the ring with respect to an engine cylinder wall when the piston crown bows when subjected to engine operating temperatures. If this is accomplished, then the slight downward inclination of the piston ring which may result from bowing of the crown when the piston is subjected to engine operating conditions, may not prove harmful. However, in mass commercial manufacture of pistons, it is extremely difficult to obtain this ideal construction due to manufacturing errors; and it frequently happens that the sides of the piston ring groove will have a slight upward or downward inclination from the ideal position which they should have when the piston is cold. The upward inclination will not be harmful because when the crown bows under operating temperatures of the engine and the ring seats flush against either side of the groove, the ring can not have an excessive downward inclination. However, such downward inclination of the ring groove sides from the ideal position when the piston is cold, is objectionable because when the piston is subjected to operating temperatures and bowing of the crown occurs, further downward inclination will result which may render the combined downward inclination excessive.

My invention is designed to overcome the above described difficulties encountered in mass commercial manufacture of pistons, and has as its objects, among others, the provision of an improved piston ring mounting which will insure against the previously described undesirable excessive downward inclination of a piston ring when the piston is subjected to working conditions in an engine, thus minimizing undesirable misalinement of such ring with respect to a cylinder wall. Other objects of my invention will become apparent from a perusal of the following description thereof.

In general, I so position the opposite sides of a piston ring groove in a piston when cold, particularly the top compression ring groove adjacent the crown of the piston, that the outer peripheral face of the ring will have substantially full face contact with the surface of a cylinder wall when either side of the ring seats flush against either side of the groove and the position of the groove sides changes as a result of bowing of the crown of the piston or distortion of the body of the piston adjacent the crown under engine operating temperatures. Such positioning is accomplished by slightly inclining the groove sides upwardly, from the normal position which such sides have heretofore been designed to have when the piston is cold. This is especially important for the lower side against which the ring is caused to seat flush during compression and working strokes of the piston.

Reference is now made to the drawing for a more detailed description of my invention. In such drawing, the angle of inclination of the groove sides is exaggerated because such angle is so small as to preclude clear illustration thereof on drawings of ordinary scale.

Fig. 1 is a fragmentary vertical sectional view of a portion of a cylinder, and a piston adapted for conventional piston rings having outer peripheral faces substantially normal or perpendicular to the sides of the rings, and embodying the construction of my invention; such construction being shown in the position which it assumes when the piston is cold and an encircled portion of the view being enlarged for purposes of illustrating the construction more clearly.

Fig. 2 is a fragmentary vertical sectional view of the cylinder and the piston of Fig. 1, illustrating the position which the construction of my invention assumes when the piston is subjected to engine operating temperatures; an encircled portion of the view, corresponding to that portion encircled in Fig. 1, being enlarged for purposes of better illustrating the construction.

Fig. 3 is a fragmentary vertical sectional view of a special preferred form of piston construction, embodying the construction of my invention; such construction being shown in a position which it occupies when the piston is cold.

The construction of my invention may be employed in any type of piston and with any type of piston ring; the form of piston illustrated in Figs. 1 and 2 being adapted for a compression ignition engine, and having mounted thereon conventional rings having peripheral faces substantially normal to sides of such rings, each of which is adapted to be mounted in a piston ring groove having substantially parallel sides. Such piston includes a body having crown 1 and skirt portion 2; the crown 1 being formed with offset combustion crater 3 commonly employed in many forms of pistons adapted for compression ignition or Diesel engines. In skirt portion 2 adjacent crown 1 are formed a plurality of compression ring grooves 4 adapted to seat compression rings 6; blow-by minimizing channels 7 being preferably formed in the upper sides of the piston ring grooves, as is described more specifically and claimed in my co-pending application Serial No. 344,305, filed July 8, 1940, for "Piston construction." Below compression rings 6, the skirt is formed with a groove 8 adapted to seat a suitable oil ring 9 which has ports 11 through which the oil can pass into groove 8, and through drain ports 12 in the body of the piston communicating with groove 8.

Heretofore, it has been the customary practice in the manufacture of such a groove to design it so that its opposite sides are parallel and normal to the axis of the piston when cold, as is indicated by the dotted line 13 (Fig. 1) designating such position for the lower side of top compression ring groove 4, so that the peripheral face 14 of the ring, adapted to engage a cylinder wall 15, is parallel to the axis of the cold piston when either side of the ring seats flush against either side of the groove. When the piston is subjected to engine operating temperatures, the crown 1 will be the hottest part of the piston, and it or the body of the piston adjacent the crown will consequently expand more than the remainder of the piston resulting in distortion. Consequently, should the sides of the grooves, particularly the top compression ring groove closest to the crown, be slightly inclined downwardly away from the crown when the piston is cold, which may very readily result from manufacturing errors arising in mass production of pistons, then such sides will become further inclined downwardly when they change their position as a result of bowing of the piston crown under engine operating temperatures. Consequently, peripheral face 14 of the piston ring, instead of having full face contact with the surface of cylinder wall 15, will contact such wall along its upper outer peripheral edge 16 when the ring is caused to seat flush against the lower side of the groove during compression and working strokes of the piston, which is extremely undesirable for the reasons previously pointed out. This problem is particularly bothersome with respect to the top compression ring groove closest to the crown because the bowing is greatest in that region. To minimize misalinement of such top compression ring with respect to the cylinder wall and thus insure that the peripheral face 14 of the top compression ring will not become excessively misalined with respect to such cylinder wall under engine operating temperatures, I design the substantially parallel sides 17 of the top compression ring groove so that they should have a slight predetermined upward inclination toward the crown of the piston, instead of being normal to the axis of the piston which is the position which they have heretofore had as is indicated by dotted line 13 in Fig. 1.

The angle of upward inclination of sides 17 toward the crown, is so calculated beforehand, in accordance with the extent of bowing or distortion which will obtain for any given type piston crown subject to any given engine operating temperatures, as to render the peripheral face 14 of the top compression ring parallel to the axis of the piston when the crown bows and either side of such ring seats flush against the associated side of its seating groove; so that under engine operating temperatures, the ring face 14 will have full face contact or engagement with the surface of cylinder wall 15, which is particularly important during compression and working strokes of the piston when the forces are such as to cause the lower side of the ring to seat flush against the lower side of its groove. Such angle of upward inclination of sides 17 will be extremely slight. In a form of engine manufactured by my assignee wherein aluminum pistons are employed, the angle of upward inclination of sides 17 is in the order of eight to ten (8 to 10) minutes for a piston having an outside diameter of about 4¼ inches, and a length of about 6⅛ inches. Thus, because such inclination is so slight, the groove sides may be considered as substantially normal to the axis of the piston when cold.

It is customary that the width of the piston ring groove be designed so that the ring fits with clearance between the sides 17 thereof; such clearance being in the order of about fifteen to twenty-five ten thousandths (.0015 to .0025) of an inch when the parts are cold. Consequently as is illustrated by Fig. 1, each side of the ring will be inclined with respect to the associated side 17 of its groove when the parts are cold and the piston is in a cylinder with its peripheral face 14 in full face engagement with the cylinder wall 15. As the position of such sides 17 changes, resulting from distortion or bowing of the crown when the piston is subjected to engine operating temperatures, it will be noted from Fig. 2, that because of their predetermined upward inclination, they will lie substantially normal to the axis of the piston, so that peripheral face 14 of the piston ring will be substantially parallel to the axis of the piston and have full face contact with the cylinder wall when supported flush against either side 17 of the groove. The dotted line 13 in Fig. 2, indicates the downwardly inclined position, the lower side of the groove would otherwise have if it were manufactured so as to be normal to the axis of the piston when cold. In such dotted line position, the lower side of the ring would be caused to have flush engagement with such groove side during compression and working strokes of the piston, with the result that only the upper outer peripheral edge 16 of the ring would contact the cylinder wall.

Upward inclination of the sides of the piston ring grooves may be provided for all of the piston rings adjacent the crown, but because the extent of bowing or distortion becomes gradiently greater toward the top of the piston, the top compression ring will be subject to the greatest distortion under engine operating temperatures. Therefore, although it is desirable to have the upward inclination of the sides of the piston ring groove for the top compression ring, this may be not necessary for the lower rings. In my preferred construction, I only employ upward inclination of the sides of the piston ring groove for the top compression ring.

Even though in actual mass production manufacture of pistons, the sides 17 of the piston ring groove may not be made with the exact calculated upward inclination when the piston is cold, because of manufacturing errors, by prescribing such upward inclination for production, it is quite unlikely that the sides of the groove will actually have a downward inclination when the piston is cold. Therefore, the ring will not have an excessive downward inclination and become excessively misalined with respect to a cylinder wall when the crown bows under engine operating temperatures.

The piston ring groove having sides designed with a predetermined upward inclination from the position they would otherwise have, need not be formed directly in the body of the piston. In this connection, Fig. 3 illustrates an actual piston construction manufactured by my assignee, in which the feature of my present invention is employed. Such construction is described more specifically and claimed in my previously mentioned co-pending application, and my co-pending applications Serial No. 344,304, filed July 8, 1940, for "Piston," and Serial No. 344,306, filed July 8, 1940, for "Fitting of members." Briefly, the piston is of aluminum and its crown is provided with an offset spherically shaped combustion crater 21, the under wall 22 of which is tapered to effect uniform flow of heat to the periphery of the piston. The top compression ring 23 is seated in an independent one-piece or integral ring groove band 24 of wear resistant metal, such as cast iron, which forms part of the piston when assembled thereon, and which is provided with blow-by minimizing channel 26. Ring groove band 24 is also provided with an inclined expansion compensating surface 28, and is held in position by threaded securing or locking ring 29 which is held against rotation by pin means 31. The opposite sides 32 of groove 33 for top compression ring 23 are parallel, and have the predetermined upward inclination when the piston is cold, for the purposes described in connection with Figs. 1 and 2.

My invention is applicable to forms of piston rings and seating grooves therefor, other than the conventional groove which heretofore was designed with parallel sides calculated to be normal to the axis of a piston when cold and which is adapted to seat a piston ring the peripheral face of which is normal to the sides of such ring. With respect to any of the numerous odd shaped rings heretofore proposed, it is only necessary for embodying the construction of my invention that the sides of the seating grooves therefor be inclined upwardly from their normal position calculated to render the peripheral face of the ring parallel to the axis of the piston when cold, to a slight extent sufficient to obtain the desired result when the position of such sides changes as a result of bowing of the piston crown under engine operating temperatures.

I claim:

1. A piston having a groove side against which a piston ring is adapted to be seated, said side being in a portion of the piston in heat transferring relationship with the piston crown and being designed to have such a position when the piston is cold, as to minimize undesirable misalinement with respect to a cylinder wall of the peripheral face of said ring when a side of said ring seats flush against said groove side and the position of said groove side changes as a result of piston distortion under engine operating temperatures.

2. A piston having a crown and a groove side adjacent said crown against which a piston ring is adapted to be seated, said side being designed with a predetermined inclination when the piston is cold calculated to render the peripheral face of said ring to be parallel to the axis of said piston when a side of said ring seats flush against said groove side and the position of said groove side changes as a result of piston distortion under engine operating temperatures.

3. The method of minimizing undesirable misalinement with respect to a cylinder wall of the peripheral face of a piston ring seated against the side of a groove in a portion of said piston in heat transferring relationship with the piston crown, comprising so positioning said groove side in the piston when cold as to render said peripheral face to have substantially full face contact with the surface of said wall when a side of said ring seats flush against said groove side and the position of said groove side changes as a result of piston distortion under engine operating temperatures.

4. A piston having a crown and a groove bounded by opposite sides between which is adapted to be seated a piston ring having an outer peripheral face substantially normal to the sides of said ring, said groove sides although substantially normal to the axis of said piston being designed with a predetermined slight inclination toward said crown when the piston is cold to minimize undesirable misalinement with respect to a cylinder wall of a piston ring seated flush against the lower side of said groove during compression and working strokes of said piston and the position of said sides changes as a result of piston distortion under engine operating temperatures.

5. A piston having a crown and a groove adjacent said crown bounded by opposite sides between which is adapted to be seated a piston ring having an outer peripheral face substantially normal to the sides of said ring, said groove sides being substantially parallel and although substantially normal to the axis of said piston being designed with a predetermined inclination toward said crown when said piston is cold, the extent of such inclination being calculated to render said sides normal to the axis of said piston when said piston distorts under engine operating temperatures.

6. A piston having a crown and a groove adjacent said crown bounded by opposite sides between which a piston ring is adapted to be seated, the position of the lower side of said groove being designed so as to be inclined with respect to the lower side of said ring when the piston is cold, the extent and direction of such inclination being so calculated as to cause the peripheral face of said ring to be substantially parallel to the axis of said piston and thus have substantially full face contact with the surface of a cylinder wall when the lower side of said ring seats flush against the lower side of said groove during compression and working strokes of said piston and the position of said lower side of said groove changes as a result of piston distortion under engine operating temperatures.

7. An aluminum piston having a crown and an independent band in the periphery thereof adjacent said crown, said band having a ring groove bounded by opposite sides between which is adapted to be seated a piston ring having an outer peripheral face substantially normal to the sides of said ring, said groove sides being substantially parallel and although substantially normal to the axis of said piston being designed with a predetermined inclination toward said crown when said piston is cold, the extent of such inclination being calculated to render said sides normal to the axis of said piston when said piston distorts under engine operating temperatures.

OSCAR L. STARR.